United States Patent Office 3,781,385
Patented Dec. 25, 1973

3,781,385
POLYMERIC PHENOLIC PHOSPHOROUS ACID
ESTER AMIDES
Elmar H. Jancis, Naugatuck, Conn., assignor to
Uniroyal, Inc., New York, N.Y.
No Drawing. Filed Apr. 5, 1971, Ser. No. 131,077
Int. Cl. C07f 9/08, 9/12
U.S. Cl. 260—930                                    12 Claims

ABSTRACT OF THE DISCLOSURE

Polymeric phenolic phosphorous ester amides, made by reacting an alkylated hydroquinone (e.g., 2,5-di-tert.-butylhydroquinone) with phosphorus trichloride and subsequently reacting the product with an amine (e.g., diisopropylamine), are useful as stabilizers for polymers (e.g., polypropylene, polyvinyl chloride EPDM).

BACKGROUND OF THE INVENTION (1) Field of the invention

This invention relates to polymeric phenolic phosphorous acid ester amides, a method of making same, and polymers stabilized therewith.

(2) Description of the prior art

Polymeric phenolic phosphorous acid esters are known (e.g., U.S. Pat. 3,509,241, De Paolo, Jr. et al., Apr. 28, 1970) as stabilizers. Unlike the products of this invention, the prior art polymeric phenolic phosphites contain no phosphoramide linkage.

Monomeric phosphorous acid ester amides are known (U.S. Pats. 2,617,794, Anderson, Nov. 11, 1952; 2,673,-871, Anderson, Mar. 30, 1954; and 3,491,057, Kato et al., Jan. 20, 1970).

The oxidative degradation of polymers resulting from exposure to heat, light and noxious gases is a well-known phenomenon. The polymers may crack, break, discolor, tackify or otherwise lose some of their desired characteristics. The manner of degradation varies and depends on the polymer.

With properly chosen additives this deterioration can be significantly inhibited. The patent literature contains a multitude of patents teaching the art of polymer stabilization. The stabilizer or more commonly the mixture of stabilizers used depends on the nature of the polymer as well as the proposed end use of the product.

Thus, for example, polypropylene film or fiber that will be exposed to light is generally protected by the following stabilizer combination: (1) a light stabilizer, commonly of the benzophenone or benzotriazole classes, (2) a heat stabilizer chosen from suitable phenolics or phosphites, (3) a peroxide decomposer, generally a sulfide, e.g., dilauryl thiodipropionate (hereafter referred to as DLTDP).

It is an unfortunate fact that an effective heat stabilizer very often has untoward effects to the activity of the light stabilizer.

The particular advantage of the stabilizers of this invention is the fact that not only are they excellent heat stabilizers, but when used together with a light stabilizer, they greatly enhance the light stability of polypropylene.

DETAILS OF THE INVENTION

The new stabilizers of the invention are polymeric phosphorous acid ester amides having repeating structural units A and B connected together, where A is a structural unit of the formula

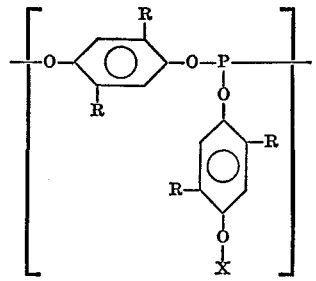

and B is a structural unit of the formula

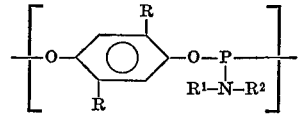

where at least one of the two R's on each phenyl nucleus is an alkyl group having from 1 to 14 carbon atoms and the second R is selected from the group consisting of hydrogen and alkyl groups having from 1 to 14 carbon atoms, X is selected from the group consisting of hydrogen, a structural unit of Formula A, and a structural unit of Formula B, $R^1$ and $R^2$ are independently selected from the group consisting of hydrogen, alkyl groups having 1 to 14 carbon atoms, and aryl groups having 6 to 14 carbon atoms, and $R^1$ and $R^2$ may be connected together to form a cyclic structure, the terminal group of said polymer attached to oxygen being hydrogen and the terminal group attached to phosphorus being selected from the group consisting of

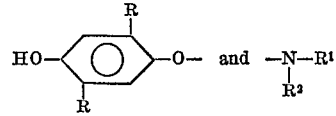

where R, $R^1$ and $R^2$ are as previously defined.

The compounds of the invention are conveniently made by heating a 2,5-dialkylhydroquinone or monoalkylhydroquinone with phosphorous trichloride in a suitable solvent, and then heating the mixture with an excess of a primary or secondary amine. In more detail the method of the invention for producing the new polymeric phenolic phosphoramides involves first providing a polymeric phenolic phosphorous acid ester containing chlorine bound to phosphorus, ordinarily by reacting a 2,5-dialkylhydroquinone or a monoalkylhydroquinone, wherein each alkyl group has from 1 to 14 carbon atoms, and phosphorous trichloride in mole ratio of from 1:1 to 2.5:1. This reaction is conveniently carried out in any suitable inert organic solvent, usually at an elevated temperature of, for example, 50° to 200° C. To speed up the reaction suitable catalysts (e.g., acid clays) may be employed. Optionally, a stream of nitrogen may be passed through the reaction mixture to help remove hydrogen chloride.

The resulting polymeric phenolic phosphite contains chlorine bound to phosphorus and is converted into the desired phosphoramide by adding an amine which replaces the chlorine attached to phosphorus. The amount of amine added should be at least sufficient to react with the phosphorus-bound chlorine in the intermediate as well as any hydrogen chloride present in the reaction mixture; usually an excess of amine is used. The amines suitable for this purpose are the primary and secondary amines of the formula

where $R^1$ and $R^2$ are as previously defined. The phosphoramide-forming reaction is facilitated by heating (e.g., at a temperature of 50–200° C.).

Amine hydrochloride is formed as a by-product; this may be filtered off upon completion of the reaction. If desired, the filtrate, which contains the desired product, may be washed with water or a saline solution. The solvent along with any unreacted amine is then usually removed by vacuum distillation. Depending on the reaction conditions and ingredients used, the products obtained vary from viscous oils to high melting solids.

The kind of alkylated hydroquinones used is governed only by their availability. Both mono- and 2,5-dialkylhydroquinones have been found to be useful starting materials. The alkyl groups can be primary, secondary or tertiary (whether straight chain, branched, or cyclic as in norbornyl); secondary and tertiary are preferred. Due to their ease of preparation 2,5-di-secondary or ditertiary alkyl hydroquinones are the preferred starting materials. Examples of alkylated hydroquinones are such mono-alkylhydroquinones as mono-methylhydroquinone,
mono-ethylhydroquinone,
mono-n-propylhydroquinone,
mono-iso-propylhydroquinone,
mono-sec-butylhydroquinone,
mono-n-butylhydroquinone,
mono-iso-butylhydroquinone,
mono-tert-butylhydroquinone,
mono-n-amylhydroquinone,
mono-iso-amylhydroquinone,
mono-tert-amylhydroquinone,
the monohexylhydroquinones,
the mono-heptylhydroquinones,
the mono-octylhydroquinones,
the mono-nonylhydroquinones,
the mono-decylhydroquinones,
the mono-undecylhydroquinones,
the mono-dodecylhydroquinones,
the mono-tridecylhydroquinones,
the mono-tetradecylhydroquinones,
cyclopentyl hydroquinone,
cyclohexyl hydroquinone,
norbornyl hydroquinone, etc.

Examples of symmetrical dialkyhydroquinones are 2,5-dimethylhydroquinone,
2,5-diethylhydroquinone,
2,5-di-n-propylhydroquinone,
2,5-di-iso-propylhydroquinone,
2,5-di-sec-butylhydroquinone,
2,5-di-iso-butylhydroquinone,
2,5-di-tert-butylhydroquinone,
2,5-di-n-butylhydroquinone,
2,5-di-n-amylhydroquinone,
2,5-di-iso-amylhydroquinone,
2,5-di-tert-amylhydroquinone,
the 2,5-di-hexylhydroquinones,
the 2,5-di-heptylhydroquinones,
the 2,5-di-octylhydroquinones,
the 2,5-di-nonylhydroquinones,
the 2,5-di-decylhydroquinones,
the 2,5-di-undecylhydroquinones,
the 2,5-di-dodecylhydroquinones,
the 2,5-di-tridecylhydroquinones,
the 2,5-di-tetradecylhydroquinones,
2,5-di-cyclopentylhydroquinone,
2,5-di-cyclohexylhydroquinone,
2,5-di-norbornylhydroquinone, etc.

A few selected examples of mixed hydroquinones are 2-methyl-5-tert-butylhydroquinone,
2-methyl-5-iso-butylhydroquinone,
2-methyl-5-sec-butylhydroquinone,
2-methyl-5-n-butylhydroquinone,
2-iso-propyl-5-tert-butylhydroquinone,
2-iso-propyl-5-iso-butylhydroquinone,
2-iso-propyl-5-sec-butylhydroquinone,
2-iso-propyl-5-tert-butylhydroquinone,
2-tert-butyl-5-tert-amylhydroquinone,
2-tert-butyl-5-sec-amylhydroquinone,
2-tert-butyl-5-tert-octylhydroquinone,
2-tert-butyl-5-sec-octylhydroquinone,
2-tert-butyl-5-sec-decylhydroquinone,
2-tert-amyl-5-tert-octylhydroquinone,
2-tert-amyl-5-sec-octylhydroquinone,
2-tert-amyl-5-sec-decylhydroquinone,
2-tert-amyl-5-sec-dodecylhydroquinone,
2-tert-amyl-5-sec-tetradecylhydroquinone,
2-tert-amyl-5-cyclopentyl hydroquinone,
2-tert-amyl-5-cyclohexyl hydroquinone,
2-tert-amyl-5-norbornyl hydroquinone, etc.

The ratio of alkylhydroquinone to $PCl_3$ can be varied, as mentioned, from 1:1 to 2.5:1. Particularly good materials have been obtained by using ratios in the range of 3:2 to 2:1.

A large variety of amines may be used in the second step of the preparation. To form an amide the amine must be ammonia, a primary amine or a secondary amine. They can be alkyl or aryl (including aralkyl or alkaryl) amines. They can be cyclic amines such as cyclopropyl, cyclobutyl, cyclopentyl or cyclohexyl amines. The alkyl groups can be primary, secondary, tertiary, straight chain or branched, cyclic or non-cyclic. The two groups on a secondary amine can be identical or they can be different. Amines of the heterocyclic variety can be employed, e.g., azirine, azetidine, pyrrolidine, piperidine, piperazine, morpholine, pyrrole, and substituted varieties thereof. Examples of amines include ammonia, allylamine, 2-aminoheptane, 2-amino-3-methylheptane, n-amylamine, benzylamine, n-butylamine, sec-butylamine, tert-butylamine, cyclododecylamine, cycloheptylamine, cyclohexylamine, cyclooctylamine, cyclopentylamine, cyclopropylamine, n-decylamine, diallylamine, di-n-butylamine, di-iso-butylamine, diethylamine, di-n-hexylamine, di-n-propylamine, di-iso-propylamine, dimethylamine, 1,2-dimethylbutylamine, 1,3 - dimethylbutylamine, 1,3-dimethylpentylamine, ethylamine, N-ethyl-n-butylamine, 2-ethoxyethylamine, n-heptylamine, iso-butylamine, 3-isopropoxypropylamine, isopropylamine, 2-methoxyethylamine, 3-methoxypropylamine, methylamine, N-methylcyclohexylamine, n-octylamine, tert-octylamine, n-propylamine, etc.

It is most convenient to use a relatively volatile amine to make removal of excess amine easy.

To promote the complete reaction of all phosphorus bound chloride an excess of an amine is used. It is clear that as more hydrogen chloride is removed from the reaction mixture, e.g., by a stream of nitrogen, less amine is necessary to constitute an excess. If no hydrogen chloride were present, the theoretical quantity of amine would be that sufficient to react with the chlorine attached to the phosphorus in the intermediate polymeric phenolic phosphorous acid ester. Usually from 1.0 to 0.05 mole of thus-bound chlorine is present in the intermediate for each mole of phosphorous trichloride used in preparing the intermediate. In practice, from 0.5 to 2 equivalents of amine, per mole of phosphorous trichloride originally charged, will ordinarily be adequate to provide the desired slight excess of amine.

In the polymeric phenolic phosphorous acid ester amides of the invention the structural units A and B defined above may be present in varying proportions. Ordinarily the products contain on the average from 0.05 to 20 A type units for each B type unit. The A and B units may be randomly distributed and may be variously arranged in either linear, branched or cyclic fashion. The total number of A plus B units in the product frequently averages from 3 to 21. It will be understood that any given preparation usually contains a mixture of various possible species, and, in at least some cases, additional products may be present having various unknown structures different from the structures described.

The compounds of the invention are useful as stabilizers for organic materials normally subject to deterioration, particularly as a result of prolonged exposure to such adverse influences as heat, oxygen and light. Such materials include polymers (plastics or resins and rubbers), oils (including petroleum oil, e.g., fuel oil, or gasoline, kerosene, lubricating oil), synthetic lubricants, etc. Included in the polymers are such resins or plastics as the saturated or low-unsaturation materials represented by the mono-olefin polymers (e.g., ethylene [low density or high density], polypropylene, plastic ethylene-propylene copolymer), or other resinous polymers such as homopolymers or copolymers of the aromatic vinyl monomers (e.g., the styrenes, such as styrene itself, alpha-methylstyrene, dichlorostyrene), the acrylic nitriles (e.g., acrylonitrile, methacrylonitrile), the acrylic esters (e.g., ethyl acrylate, methyl methacrylate), the acrylic acids (acrylic acid, methacrylic acid) the vinyl esters (e.g., vinyl acetate, vinyl propionate), vinyl chloride. Of the copolymers, particular mention may be made of styrene-acrylonitrile resin, and ABS (which contains some unsaturation but is nevertheless frequently classified with the typical saturated thermoplastics because of the manner in which it is used). Of the rubbery polymers there may be mentioned the unsaturated diene polymer rubbers which are homopolymers of conjugated dienes such as isoprene (as represented by natural rubber and synthetic polyisoprene, of high cis content or otherwise), butadiene (solution-prepared or emulsion-prepared polybutadiene, of high cis content or otherwise), etc., or copolymers of such dienes with other copolymerizable monomers such as the monomers mentioned above, as in such highly unsaturated rubbers as SBR, NBR, butadiene-vinylpyridine rubber, etc., or such low unsaturation rubbers as butyl rubber. Other important rubbers having no unsaturation or little unsaturation are EPM or EPDM (in which the diene may be, for example, hexadiene-1,4-di-cyclopentadiene, ethylidene norbornene, etc.). Included are graft copolymers of monoethylenically unsaturated copolymerizable monomers, such as those mentioned previously, especially styrene and acrylonitrile, on EPM or EPDM. Polyacetal resins, polyarylene polyether resins, polyarylene polysulfone resins, and blends of same with ABS or the like, may also be mentioned. Further suitable polymers are disclosed in 3,509,241 previously referred to.

In many cases it is advantageous to employ the stabilizers of the invention along with one or more additional stabilizers or synergists. Particularly useful conventional synergists are the sulfides such as those disclosed in U.S. Pat. 3,493,638, Meltsner, Feb. 3, 1970 (these may be referred to as dialkylthiodialkanoates). Additionally of particular importance are the conventional U.V. stabilizers such as the benzophenone or benzotriazole U.V. stabilizers (see, for example, 3,509,241, previously referred to, column 6, line 65 to column 7, line 43).

Only a small amount of the stabilizer, effective to confer the desired degree of stabilization, need be used, in accordance with conventional practice as described in 3,509,241 previously referred to, column 6, lines 37–61 and column 7, lines 43–52.

In addition to the products described in the working examples below, the following is a listing of further products of the invention.

| Hydroquinone | HQ:PCl$_3$ ratio | Amine | Nature of product |
|---|---|---|---|
| di-tert-Butyl | 3:2 | di-n-Butylamine | Solid. |
| Do | 2:1 | N-methylamine | Do. |
| Do | 2:1 | Diphenylamine | Do. |
| di-tert-Amyl | 1:1 | di-iso-Propylamine | Do. |
| di-tert-Butyl | 2:1 | Ammonia | Do. |
| Do | 1:1 | di-iso-Propylamine | Do. |
| di-sec-Tetradecyl | | Methylamine | Liquid. |
| mono-tert-Butyl | 2:1 | di-n-Butylamine | Solid. |
| mono-sec-Tetradecyl | 2:1 | di-iso-Propylamine | Liquid. |

The new chemicals of the invention are, as indicated, phosphites, and contain phosphorus in a different oxidation stage from phosphates, which are quite different in their chemical behavior.

The following examples will serve to illustrate the practice of the invention in more detail.

EXAMPLE 1

To .3 mole of 2,5-di-tert-butylhydroquinone in 250 ml. chlorobenzene was added .15 mole phosphorus trichloride in 100 ml. chlorobenzene. The reaction mixture was heated at 80° for 18 hours and at 135° for 2 hours. The mixture was allowed to cool to room temperature and .5 mole diisopropylamine was added. The reaction mixture was then heated at 100° for 30 minutes. After cooling, the gelatinous mass was broken up by slurrying it with hexane and water. After being washed well with water and hexane the product was filtered and dried.

The product was a white granular powder which melted with decomposition at 180–280° C. $\overline{M}_n$=2030; percent N=1.20.

EXAMPLE 2

To .3 mole of 2,5-di-tert-butylhydroquinone in 250 ml. chlorobenzene was added .15 mole phosphorus trichloride in 100 ml. chlorobenzene. The reaction mixture was heated at 100° C. for 17.5 hours. The reaction mixture was then allowed to cool to room temperature and .5 mole di-n-butylamine was added. The mixture was again heated at 90° C. for 2 hours. After cooling the product was filtered. The chlorobenzene in the filtrate was distilled under reduced pressure.

The residue is an amber gum that can be ground to a powder which eventually sinters at room temperature. $\overline{M}_n$=1030; percent N=3.3.

EXAMPLE 3

To .225 mole of 2,5-di-tert-butylhydroquinone in 180 ml. chlorobenzene was added .15 mole phosphorus trichloride in 100 ml. chlorobenzene. The mixture was heated at 90° C. for 19 hours, at 130° for 2.5 hours, and was then cooled to room temperature. After the addition of .5 mole cyclohexylamine the reaction mixture was heated at 90° C. for 45 minutes. The reaction mixture was then cooled to 40° C. and was filtered. The chlorobenzene was distilled under reduced pressure.

The residue was an amber glassy solid that could be ground to a yellow powder which does not sinter at room temperature. $\overline{M}_n$=1530; percent N=3.96.

EXAMPLE 4

To .3 mole of 2,5-di-tert-butylhydroquinone in 250 ml. chlorobenzene was added .15 mole phosphorus trichloride in 100 ml. chlorobenzene. The reaction mixture was heated at 90° C. for 19 hours, at 130° C. for 3 hours and then was cooled to room temperature. After the addition of .5 mole morpholine the mixture was again heated at 90° C. for 1 hour. The reaction mixture was allowed to cool and was then filtered. The solvent and excess amine was distilled under reduced pressure.

The amber colored glassy residue was ground to a sticky powder. $\overline{M}_n=800$; percent N=2.41.

EXAMPLE 5

To .2 mole 2,5-di-tert-amylhydroquinone in 200 ml. chlorobenzene was added .1 mole phosphorus trichloride in 100 ml. chlorobenzene. The reaction mixture was heated at 90° for 25 hours, at 125° C. for 3 hours, and was then cooled to room temperature. After addition of .5 mole of di-n-butylamine the reaction mixture was heated at 90° for 1.5 hours. The product was then cooled and filtered. The solvent was distilled under reduced pressure.

The residue is a brown, taffylike material. $\overline{M}_n=1550$; percent N=2.30.

EXAMPLE 6

To .2 mole di-sec-octylhydroquinone in 250 ml. chlorobenzene was added .1 mole phosphorus trichloride in 100 ml. chloroform. The reaction mixture was heated at 90° C. for 21 hours, at 135° C. for 2 hours, and was then allowed to cool to room temperature. After addition of .5 mole of di-n-butylamine the reaction product was heated on the steam bath for 2 hours. After being allowed to cool the mixture was filtered. The solvent and excess amine was distilled under reduced pressure.

The residue was an amber liquid. Percent N=1.71.

EXAMPLE 7

This example illustrates the use of the previously described reaction products in the heat-oxidation stabilization of an olefinic plastic. The stabilizers were incorporated into Profax 6501 (Hercules polypropylene) resin on a mill at 330° F. Sheets (75 mils) were molded in a Farrel press and buttons punched from these sheets. The buttons were exposed in a circulating air oven at 300° F. Failure time, measured in days, is the time required to embrittle two out of three buttons.

The experimental stabilizers were incorporated at a concentration of 0.1 part per hundred. All specimens (including the blank) contained 0.4 part DLTDP (dilauryl thiodipropionate).

The experimental stabilizer numbers refer to the preceding example numbers.

| | Failure time (days) |
|---|---|
| Blank | *14 |
| Experimental stabilizer: | |
| 1 | *74 |
| 2 | *68 |
| 3 | *77 |
| 4 | *74 |
| 5 | 42 |
| 6 | 43 |

*Starred values are average values from several tests.

EXAMPLE 8

This example illustrates the use of our polymeric phosphorous acid ester amides as heat stabilizers and light stability enhancers in combination with a benzophenone light stabilizer in a polyolefin.

Polypropylene discs were prepared as in Example 7, and were then compressed into 10 ml. thicksheets in a press at 27,000 p.s.i. and 370° F. These specimens were then exposed in a FSL/BL unit (Fluorescent Sunlamp/Blacklight unit manufactured by the American Ultraviolet Co.) and the number of days to embrittlement were recorded.

The discs were concurrently tested for heat stability in the manner described in Example 7.

The experimental stabilizers were incorporated at a concentration of 0.1 p.p.h. All specimens (including the blank) contained 0.4 part DLTDP and .2 part Cyasorb 531 [1].

[1] 2-hydroxy-4-octyloxybenzophenone.

| | Failure time (days) | |
|---|---|---|
| | Heat aging | FSL/BL aging |
| Blank | [1]13 | [1]49 |
| Experimental stabilizer: | | |
| 1 | [1]72 | [1]82 |
| 2 | [1]71 | [1]67 |
| 3 | 57 | 65 |
| 4 | 70 | 46 |
| 5 | 60 | 68 |
| 6 | 54 | 67 |
| Commercial stabilizer [2] | [1]81 | [1]34 |

[1] Average values from several experiments.
[2] 3-methyl-6-tert-butylphenol/crotonaldehyde condensate marketed as Topanol C.A.

EXAMPLE 9

This example illustrates the usefulness of a polymeric phosphorous acid ester amide as a stabilizer in polyvinyl chloride. The experimental stabilizer was milled into a polyvinyl chloride stock containing 2.5 p.p.h. barium/cadmium soap stabilizer for PVC (Argus Mark WS) and 3.0 p.p.h. octyl epoxy tallate processing aid for PVC (Drapex 4.4). Films were pressed to a thickness of 10 mils and exposed in the BL/FSL unit. Days to embrittlement were recorded.

| | Conc. percent | Days to break |
|---|---|---|
| Blank | | [1]22 |
| Experimental stabilizer 4 | .225 | [1]30 |
| Commercial stabilizer [2] | .225 | [1]44 |
| Experimental stabilizer 4/commercial stabilizer | .1/.125 | [1]55 |

[1] Average values.
[2] 2-hydroxy-4-methoxybenzophenone marketed as Cyasorb UV9.

EXAMPLE 10

This example illustrates the use of our polymeric phosphorous acid ester amides as heat stabilizer for an ethylene/propylene terpolymer rubber.

A masterbatch was prepared by milling 1,000 parts EPDM (ethylene-propylene-ethylidene norbornene, E/P ratio 56/44, iodine number 9.5), 50 parts zinc oxide, 400 parts SRF Black, and 300 parts FT Black.

One part of experimental stabilizer plus 7 parts dicunyl peroxide curative is added to 177 parts of the masterbatch and the specimens are then cured at 320° F. for 30 minutes.

Specimens are aged 35 hours at 350° F., and the loss of tensile strength is recorded.

| Additive: | Percent tensile retained |
|---|---|
| None | 10 |
| Experimental stabilizer— | |
| 1 | 33 |
| 4 | 49 |

Other experimental stabilizers made using ditert.-butyl hydroquinone as the alkylhydroquinone and ammonia, di-n-butylamine, or di-isopropylamine as the amine gave tensile retentions of 56, 64 and 51%, respectively, in this test.

Having thus described my invention, what I claim and desire to protect by Letters Patent is:

1. A polymeric phosphorous acid ester amide having repeating structural units A and B connected together, where A is a structural unit of the formula

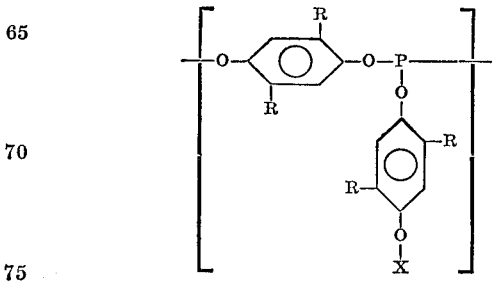

and B is a structural unit of the formula

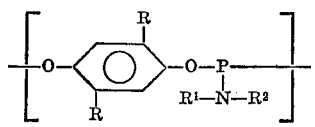

where
at least one of the two R's on each phenyl nucleus is an alkyl group having from 1 to 14 carbon atoms and the second R is selected from the group consisting of hydrogen and alkyl groups having 1 to 14 carbon atoms,
X is selected from the group consisting of hydrogen, a structural unit of Formula A, and a structural unit of Formula B,
$R^1$ and $R^2$ are independently selected from the group consisting of hydrogen, alkyl groups having 1 to 14 carbon atoms, and aryl groups having 6 to 18 carbon atoms, the terminal group of said polymer attached to oxygen being hydrogen and the terminal group attached to phosphorus being selected from the group consisting of

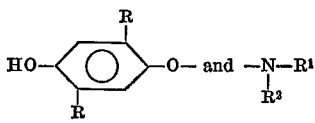

where R, $R^1$ and $R^2$ are as previously defined.

2. A polymeric phosphorous acid ester amide as in claim 1 in which one R is selected from the group consisting of secondary alkyl and tertiary alkyl and the other R is selected from the group consisting of hydrogen, secondary alkyl and tertiary alkyl.

3. A polymeric phosphorous acid ester amide as in claim 1 which contains an average of from 0.05 to 20 A type units for each B type unit.

4. A polymeric phosphorous acid ester amide as in claim 1 in which the average total number of A plus B units is from 3 to 21.

5. A phenolic phosphorous acid ester amide as in claim 1 in which one R is selected from the group consisting of tert.-butyl, tert.-amyl, sec.-tetradecyl, and sec.-octyl, and the other R is selected from the group consisting of hydrogen, tert.-butyl, tert.-amyl, sec.-tetradecyl, and sec.-butyl.

6. A phenolic phosphorous acid ester amide as in claim 1 in which $R^1$ and $R^2$ are n-butyl, methyl, phenyl, isopropyl, hydrogen, or cyclohexyl.

7. A phenolic phosphorous acid ester amide as in claim 1 in which each R is tert.-butyl or tert.-amyl.

8. A phenolic phosphorous acid ester amide as in claim 1 in which each R is tert.-butyl, and $R^1$ and $R^2$ are isopropyl.

9. A phenolic phosphorous acid ester amide as in claim 1 in which each R is tert.-butyl, and $R^1$ and $R^2$ are n-butyl.

10. A phenolic phosphorous acid ester amide as in claim 1 in which each R is tert.-butyl and $R^1$ and $R^2$ are cyclohexyl.

11. A phenolic phosphorous acid ester amide as in claim 1 in which each R is tert. amyl and $R^1$ and $R^2$ are n-butyl.

12. A phenolic phosphorous acid ester amide as in claim 1 in which each R is sec.-octyl and $R^1$ and $R^2$ are n-butyl.

References Cited
UNITED STATES PATENTS

| | | | |
|---|---|---|---|
| 3,509,241 | 4/1970 | De Paolo et al. | 260—927 R |
| 2,673,871 | 3/1954 | Anderson | 260—941 |
| 2,682,521 | 6/1954 | Coover | 260—930 X |

LEWIS GOTTS, Primary Examiner

R. L. RAYMOND, Assistant Examiner

U.S. Cl. X.R.

260—45.8 N, 45.9 R, 239 EP, 247.7 C, 247.7 D, 268 K, 297 P, 326.8, 984